July 28, 1959
G. L. DEAN ET AL
2,896,355
FISH LURE HOOKS
Filed Oct. 30, 1956
FIG. 1.
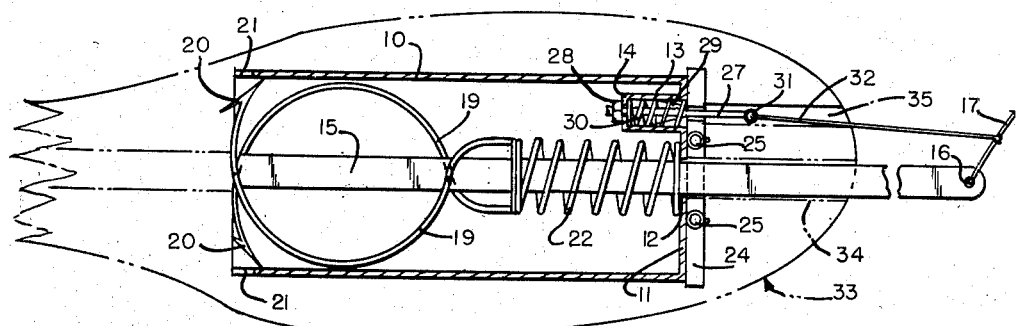
FIG. 2.
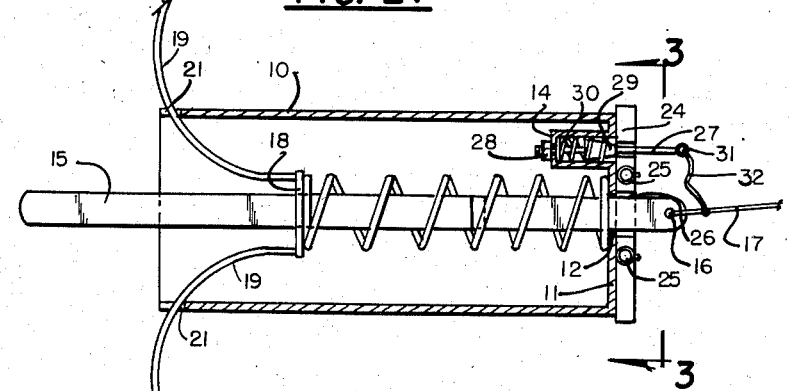
FIG. 3.
FIG. 4.
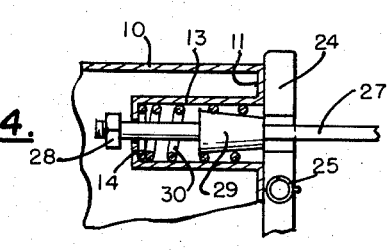
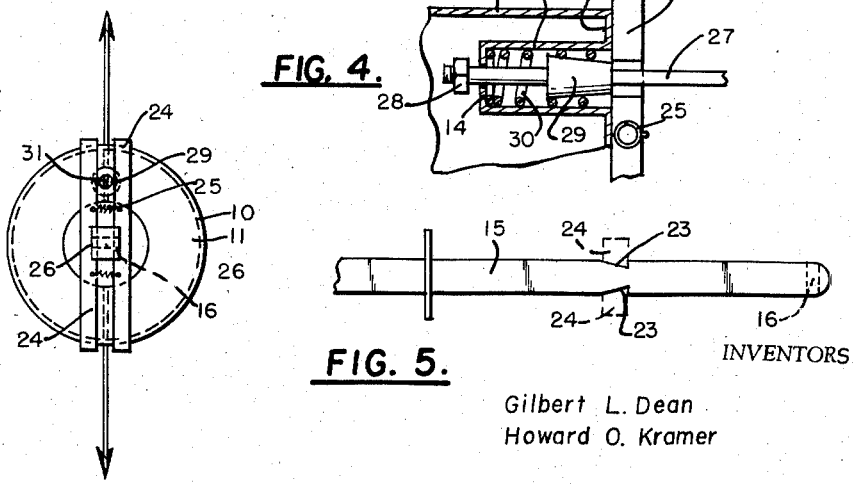
FIG. 5.
INVENTORS
Gilbert L. Dean
Howard O. Kramer

2,896,355
FISH LURE HOOKS

Gilbert L. Dean and Howard O. Kramer, Spokane, Wash.

Application October 30, 1956, Serial No. 619,218

2 Claims. (Cl. 43—35)

This invention relates to hidden fish hook mechanisms for fishing plugs or artificial lures.

It is an object of the present invention to provide a hidden fish hook mechanism for fishing lures wherein the hooks before being sprung are completely hidden and cannot become entangled in weeds or other debris and wherein the mechanism is completely enclosed before being sprung so as to present a more natural appearance to the fish.

It is another object of the present invention to provide a hidden fish hook mechanism for fishing lures of the above type wherein, as the hooks are sprung to the operative position, it becomes unnecessary for the fisherman to set the hooks by jerking the pole and wherein the tension adjustment for releasing the hooks can be adjusted for various size and types of fish and turbulence of water.

Other objects of the invention are to provide a hidden fish hook mechanism for fishing lures bearing the above objects in mind which is of simple construction, has a minimum number of parts, is inexpensive to manufacture and efficient in operation and use.

For other objects and for a better understanding of the invention, reference may be had to the following detailed description taken in connection with the accompanying drawing, in which:

Figure 1 is a side elevational view shown partly in section of a preferred embodiment of the present invention before the hooks are sprung to their operative position;

Fig. 2 is a view similar to Fig. 1 but showing the hooks sprung to their operative position;

Fig. 3 is an end elevational view looking along the line 3—3 of Fig. 2;

Fig. 4 is an enlarged vertical sectional view shown partly in elevation of a portion of the device; and Fig. 5 is a top plan view of the shank forming a part of the invention.

Referring now more in detail to the drawing, 10 represents a hollow cylindrical casing having one end open and the other end having the circular closure or end wall 11 with a centrally located square opening 12, substantially as illustrated. The closure 11 above the central opening 12 is provided with a circular opening and is integrally formed therearound with the inwardly extending, hollow cylindrical casing 13, the inner end of which is closed by the end wall or closure 14 (Fig. 4).

An elongated shaft 15 of square cross section is slidably positioned within the opening 12 and is formed at its forward end with the opening 16 to which the fishing line 17 is connected. A collar 18 is fixedly secured to the shaft 15 near its center to which are rigidly secured at oppositely disposed points thereon the spring steel outwardly extending hooks 19 which terminate in the sharp ends 20 and are normally self biased toward the expanded position shown in Figure 2. The open end of the casing 10 is provided with oppositely disposed slots 21 which receive the hooks 19 outwardly therethrough when the hooks are permitted to expand when the collar is moved to the extended position of Fig. 2. In the retracted position shown in Figure 1, the hooks are confined within the interior of the casing.

The hooks 19 are urged to the extended position of Fig. 2 by means of the coil spring 22 which sleeves the shaft 15 intermediate the collar 18 and the end closure 11.

Releasable means are provided for retaining the hooks 19 in the retracted position of Fig. 1 and include a pair of oppositely disposed slots 23 formed in the opposite sides of the shaft 15. Catch means are provided for engaging the slots 23 when the shaft is in the position of Fig. 1 and include a pair of oppositely disposed elongated strips 24 connected by the transverse coil springs 25 on opposite sides of the shaft 15, the strips 24 having centrally located, oppositely disposed cutout portions 26 adapted to engage within the slots 23 and to be retained thereat by the springs 25.

Means are provided for separating the strips 24 and to release the shaft 15 upon the fish striking and include the elongated shaft or rod 27 slidably positioned within a central opening provided in the end wall 14 of the inner casing 13, the outward movement of the shaft 27 being limited by the friction nut 28. A frustoconical wedge 29 is fixedly positioned on the shaft 27 within the open end of the casing 13 and is normally retained in this position by the coil spring 30 that is snugly engaged with the wedge 29 and is expansible within the casing 13 to allow movement of the wedge 29. The outer end of the rod 27 is formed with the loop 31 which is connected to a line 32 which is in turn connected to the line 17 forwardly of the mounting opening 16 of the shaft 15.

When the fish strikes, the line 32 being shorter to the fisherman than line 17 (Fig. 1) receives a pull from the fish strike. This pulls the cone-shaped wedge 29 between the strips 24 to separate the same and to release the cutout portions 26 thereof from the notches 23, thus permitting the spring 22 to expand and driving the fish hooks outwardly to the extended position of Fig. 2 through the slots 21, the spring helping to hold the hooks in the extended position in the fish's mouth. The spring 30 produces the correct amount of tension and is adjustable by turning the shaft 27 down in the friction lock nut 28 to accommodate rough waters, weeds and the like and as well for different types of fish strikes. When the shaft 15 is released and driven back with the spring 22 and the hooks 19 expanded, this releases the tension from the line 32 and places the pull of the fish on the shaft 15 and line 17.

The hooks are made of spring steel wire and may be of a greater number than the two shown, being of spring steel wire they supply the expansion force coming through the slots 21. Their power is further increased by the spring 22 driving them deep into the fish.

The hidden fish hook mechanism thus described can be designated and adapted to almost any fishing plug or artificial lure, such a lure being indicated generally at 33 and having the central opening 34 which slidably receives the shaft therethrough as well as a second opening 35 which receives therethrough the shaft 27 and line 32.

While various changes may be made in the detail construction, it shall be understood that such changes shall be within the spirit and scope of the present invention as defined by the appended claims.

What we claim as new and desire to protect by Letters Patent of the United States is:

1. A hidden fish hook mechanism for fishing lures or the like comprising a hollow casing open at the rear end and being formed with a forward end closure, said end closure having a central opening therethrough, an elongated shaft slidable through said opening longitudinally of said casing, said shaft being of greater length than said casing and in one position thereof forwardly and rearwardly portions of said shaft extend outwardly of said casing, means for retaining said shaft in said one position comprising a collar secured to said shaft intermediate the ends thereof and a coil spring sleeving said shaft intermediate said collar and said closure, at least two oppositely disposed spring hooks connected to said shaft, when the shaft is in said one position said hooks being adapted to extend outwardly through the open end of said casing through slots provided therefor in the rear end thereof, said spring hooks and their inner ends being fixedly mounted upon opposite portions of said collar, said shaft being adapted to be retracted from said one position to a position within the open end of said casing, releasable locking means for retaining said shaft in the retracted position within the open end of said casing with a portion of said shaft extending forwardly therethrough, and trigger means adapted to be actuated upon the fish striking for releasing said locking means, said shaft when in the retracted position drawing said spring hooks inwardly of said casing, said locking means comprising a pair of elongated strips positioned across the outer face of said casing closure on opposite sides of said shaft, a pair of coil springs interconnecting said strips on opposite sides of said shaft whereby to urge the same thereagainst, said strips at their central portions having rectangular oppositely disposed cutouts on their inner faces, said shaft on opposite sides being formed with oppositely disposed notches adapted to receive said cutout portions therewithin whereby to retain the shaft in the retracted position against the action of said coil spring.

2. A hidden fish hook mechanism according to claim 1, wherein said closure above said opening therein is formed with a second opening, and wherein said trigger mechanism includes a hollow cylindrical casing surrounding said second opening and extending inwardly of said end closure and having an inner end wall, a second shaft slidably positioned within a central opening in said inner wall and extending outwardly through said second closure opening intermediate said strips, a substantially frusto-conical wedge fixedly carried by said second shaft within said inner casing having its smaller end outermost, a coil spring within said inner casing surrounding said wedge-shaped member, adjustable stop means on the inner end of said second shaft adapted to abut the said inner casing end closure, the forward end of said second shaft having a loop formed therein, the forward end of said first shaft having an opening receiving therethrough in fixed engagement the fishing line, and a second line connected to said loop at one end and to the fishing line forwardly of said first shaft at the other end whereby said second shaft may be drawn outwardly and along with said wedge-shaped member to spread said strips and to release said first shaft.

References Cited in the file of this patent

UNITED STATES PATENTS

| | | |
|---|---|---|
| 610,098 | Sly | Aug. 30, 1898 |
| 2,521,555 | Widmer | Sept. 5, 1950 |

FOREIGN PATENTS

| | | |
|---|---|---|
| 614,570 | Great Britain | Dec. 17, 1948 |